United States Patent
Ekman et al.

(10) Patent No.: US 8,075,303 B2
(45) Date of Patent: Dec. 13, 2011

(54) METHOD FOR HOMOGENIZING THE HEAT DISTRIBUTION AS WELL AS DECREASING THE AMOUNT OF $NO_x$

(75) Inventors: Tomas Ekman, Saltsjö-Boo (SE); Ola Ritzén, Akersberga (SE); Anders Lugnet, Rimbo (SE); Mats Gartz, Sollentuna (SE)

(73) Assignee: AGA AB, Lidingo (SE)

( * ) Notice: Subject to any disclaimer, the term of this patent is extended or adjusted under 35 U.S.C. 154(b) by 50 days.

(21) Appl. No.: 12/728,502

(22) Filed: Mar. 22, 2010

(65) Prior Publication Data

US 2010/0239989 A1 Sep. 23, 2010

(30) Foreign Application Priority Data

Mar. 20, 2009 (SE) ..................................... 0950178

(51) Int. Cl.
*F23L 7/00* (2006.01)
(52) U.S. Cl. .................................. 431/10; 431/8; 431/12
(58) Field of Classification Search ..................... 431/10, 431/8, 12, 351, 354, 190
See application file for complete search history.

(56) References Cited

U.S. PATENT DOCUMENTS

| 5,601,425 A | 2/1997 | Kobayashi et al. |
| 6,705,117 B2 * | 3/2004 | Simpson et al. ............. 65/134.4 |
| 2007/0287109 A1 | 12/2007 | Lodin |

FOREIGN PATENT DOCUMENTS

| SE | 0601274 | 12/2001 |
| WO | 2007/126980 | 11/2007 |

* cited by examiner

*Primary Examiner* — Alfred Basichas
(74) *Attorney, Agent, or Firm* — Young & Thompson

(57) ABSTRACT

Method for homogenizing the heat distribution as well as decreasing the amount of $NO_x$ in combustion products when operating an industrial furnace with at least one conventional burner using air as an oxidant. An additional oxidant including at least 50% oxygen gas is caused to stream into the furnace through a lance. The total amount of oxygen supplied is balanced against the amount of fuel being supplied through the air burner. Firstly, the combination of at least 40% of the supplied oxygen is supplied through the additional oxidant, the lance is arranged at a distance from the air burner of at least 0.3 meters, and the additional oxidant streams into the furnace through the lance with at least sonic velocity, and secondly the additional oxidant is supplied only when the air burner is operated at a certain lowest power or at a higher power.

19 Claims, 2 Drawing Sheets

METHOD FOR HOMOGENIZING THE HEAT DISTRIBUTION AS WELL AS DECREASING THE AMOUNT OF $NO_x$

Today industrial furnaces are widely used for melting and otherwise heat treating for example metals. Many of these furnaces use one or several burners of the conventional type, fed by a fuel such as propane, oil, natural gas, or the like, and fed also with an oxidant. In many cases, air is used as oxidant.

Such furnaces can be of various sizes. It is often desirable to maintain an even temperature distribution within the furnace, which can be difficult to achieve in the case of large furnaces, since the convective heat transfer within the furnace becomes less effective as the volume of the furnace increases.

As a solution to these problems, so-called oxyfuel burners have been suggested for use in industrial furnaces. In oxyfuel burners, oxygen gas is used as oxidant. Such burners offer higher efficiency, whereby less fuel is needed to achieve the same yield in terms of heating of the material to be heated in the furnace. Also, the amount of $NO_x$ compounds produced is decreased.

However, there is a problem in that it is associated with substantial cost to exchange an air-fed burner for an oxyfuel burner in an industrial furnace. Furthermore, it is difficult to maintain high temperature homogeneity in the whole furnace volume when used in large industrial furnaces, since convection decreases as a consequence of the lesser amounts of flue gases produced at the lower operation powers for oxyfuel burners. The result is uneven furnace temperature, with associated uneven production properties.

Another suggested solution, on the other hand, is to increase the proportion of oxygen gas in the supplied air. However, this has proven to be afflicted with other problems, such as burner wear and increased emissions of nitrogen oxides.

The Swedish patent no 0601274-4 describes a method for homogenising the heat distribution and for decreasing the amount of $NO_x$ in the combustion products when using an industrial furnace using air as the oxidant in combination with an additional oxidant being supplied by means of lancing.

Herein, the expression "to lance" additional oxidant through a "lance" refers to the supply of additional oxidant to the combustion space in an industrial furnace through a supply conduit arranged at a distance from the burner.

However, residual products in the form of $NO_x$ compounds formed during combustion in such industrial furnaces still constitute a problem. This is not desirable, since $NO_x$ compounds negatively affect the environment, and since there often are regulatory limitations present for the volumes of $NO_x$ compounds that may be produced in various industrial processes.

Moreover, in practice the installation of several lances per burner will often be required, in order to avoid asymmetrical flame forms and therefore temperature gradients in the furnace space. This is costly, not least since control devices and other peripheral equipment must be installed.

WO 2007/126980 A2 describes a burner in which lances for additional fuel as well as additional oxidant are arranged. This solution gives rise to relatively large amounts of $NO_x$.

The present invention solves the above problems.

Hence, the present invention relates to a method for homogenizing the heat distribution as well as decreasing the amount of $NO_x$ in the combustion products when operating an industrial furnace with at least one conventional burner using air as oxidant, where a lance is introduced into the furnace, an additional oxidant comprising at least 50% oxygen gas is caused to stream into the furnace through the lance, and the total amount of oxygen supplied, partly through the air, partly through the additional oxidant, is supplied in a predetermined ratio in relation to the amount of fuel being supplied through the air burner, and is characterised in firstly, the combination of that at least 40% of the supplied oxygen is supplied through the additional oxidant, that the lance is caused to be arranged at a distance from the air burner which is sufficient for the amount of formed $NO_x$ in the combustion gases from the air burner to be at least 30% less as compared to the amount of $NO_x$ which would have been formed in case the lance had been arranged in the air burner itself, and that the additional oxidant is caused to stream into the furnace through the lance with at least sonic velocity, and secondly that the additional oxidant is supplied only when the air burner is operated at a certain lowest power or at a higher power.

The invention will now be described in detail, with reference to exemplifying embodiments of the lancing method according to the invention, and with reference to the attached drawings, where:

Figure 1:
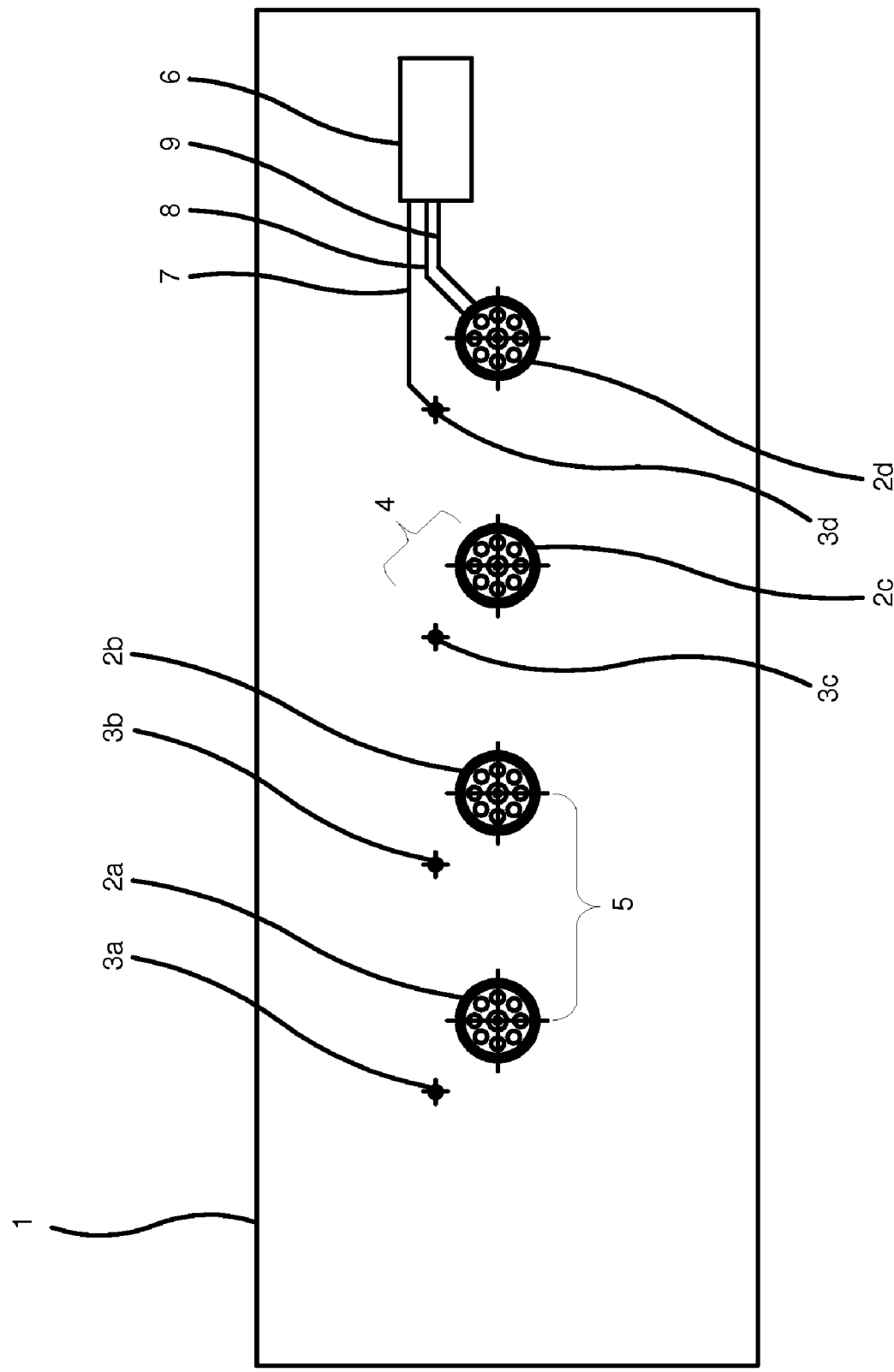
FIG. 1 is a sideview of an industrial furnace with burners using air as oxidant, where burners in the furnace have each been furnished with a lance for additional oxidant in accordance with the method of the present invention.

In FIG. 1, an industrial furnace 1 is shown from the side. The furnace 1 is heated using a series of four conventional air burners 2a, 2b, 2c, 2d. The burners 2a, 2b, 2c, 2d are driven with oil as fuel. However, the fuel may be any suitable fuel, such as for example natural gas and other solid, liquid or gaseous hydrocarbons. As a matter of fact, the invention may be used in connection with any solid, liquid or gaseous, industrial fuel.

The furnace 1 is a conventional industrial furnace, and may be used to heat blanks for further processing, in order to alter the properties of blanks, to melt metal material, to melt glass or for other purposes. The present invention finds particularly advantageous use in furnaces for continuous heating in zones of metal material. In this case, one, several or all zones may be advantageously operated by the use of a method according to the present invention.

During use of the furnace 1 with conventional air burners 2a, 2b, 2c, 2d, without the lancing method according to the present invention, large amounts of $NO_x$ compounds will be formed as residual products during the combustion of the fuel. Moreover, a sufficiently homogenuous temperature will be difficult to maintain in the furnace 1 for all desired applications.

According to the present invention, for each burner 2a, 2b, 2c, 2d, a respective lance 3a, 3b, 3c, 3d is mounted beside the burner in question, through the furnace 1 wall and into the furnace 1.

It is only necessary to furnish a single air burner with a lance in order to achieve the advantages of the present invention, although it is preferred to furnish several air burners with one respective lance each. It is also possible to for example furnish only some of the burners in a certain zone with a respective lance each.

Each respective lance 3a, 3b, 3c, 3d is inserted through a respective hole (not shown), running through the furnace 1 wall, and the surface of its end facing into the furnace 1 is brought to a position essentially in level with the inner wall surface of the furnace 1. Through the lance 3a, 3b, 3c, 3d, and into the furnace 1, an additional oxidant, besides the air being supplied through the burners 2a, 2b, 2c, 2d, is supplied. The additional oxidant comprises at least 50 percentages by weight oxygen, preferably at least 60 percentages by weight oxygen and more preferably at least 85 percentages by weight oxygen. The oxidant is supplied to the lance 3a, 3b, 3c, 3d under overpressure, resulting in it streaming out from the lance 3a, 3b, 3c, 3d at sonic velocity or faster.

Thus, according to the invention the additional oxidant is supplied at high velocity. Therefore, it is preferred that de laval nozzles are used in the lances 3a, 3b, 3c, 3d, so that the additional oxidant is supplied through at least one such de laval nozzle.

According to a very preferred embodiment, the additional oxidant is supplied at an overpressure of at least about 6 bars, more preferably at least about 9 bars, and at a velocity of between Mach 1.5 and Mach 1.8, more preferably between Mach 1.6 and Mach 1.8, most preferably between Mach 1.7 and Mach 1.8.

Since a stream of additional oxidant is supplied into the furnace 1 through the lances 3a, 3b, 3c, 3d, in addition to the oxidant already supplied into the furnace 1 through the burners 2a, 2b, 2c, 2d, it is required that the air supply of the burners 2a, 2b, 2c, 2d is adjusted downwards, in order for a certain desired mass proportion between the supplied fuel and the total supplied oxidant to be maintained. Thus, the oxidant supply of the burners 2a, 2b, 2c, 2d is adjusted downwards so that the desired mass proportion is maintained, depending on the amount of supplied oxidant through the lances 3a, 3b, 3c, 3d. In order to achieve the advantages of the present invention, as far as the burners 2a, 2b, 2c, 2d having a respective lance 3a, 3b, 3c, 3d are concerned, at least 40% of the total supplied oxygen must be supplied through the lances 3a, 3b, 3c, 3d. Preferably, at least about 50%, most preferably between 50% and 80%, of the oxygen is supplied to the furnace 1 through the lances 3a, 3b, 3c, 3d, and the rest of the oxygen through the air burners 2a, 2b, 2c, 2d. These proportions are valid during operation at or near full power. See the discussion in connection to FIG. 2 below for a more detailed description.

When additional oxidant is supplied to the combustion space in this way, at very elevated velocities, a powerful recirculation of the combustion products in the furnace 1 is achieved. As a matter of fact, the present inventors have discovered that it is possible to make the flames so large that they fill out essentially the whole furnace space of an industrial furnace being heated by the burners 2a, 2b, 2c, 2d. This takes place without flames leaving the furnace 1 through the exhaust system. The temperature of the flue gases instead drops, and thus increases the efficiency in the furnace 1.

This, in turn, is associated with certain advantages. Firstly, the combustion temperature falls because of dilution effects to such levels that the formation of $NO_x$ compounds decreases drastically during combustion, which is desirable.

Secondly, the inventors have been able to establish that lancing of oxidant at the above indicated high velocities creates such turbulence, and thereby convection, inside the furnace 1 volume, so that the temperature homogeneity increases very significantly in comparison to when lancing takes pace at lower velocities. This, in turn, leads to uniform operation, also during use in very large industrial furnaces.

Furthermore, the present inventors have surprisingly discovered that these advantages increase in case the above described high lancing velocities are combined with a positioning of each lance 3a, 3b, 3c, 3d at a certain distance from the respective burner 2a, 2b, 2c, 2d.

Thus, according to the invention, each respective lance 3a, 3b, 3c, 3d is arranged at a distance from the respective burner 2a, 2b, 2c, 2d which is sufficient for the amount of formed $NO_x$ in the flue gases from the burner 2a, 2b, 2c, 2d to decrease with at least 30% as compared to the amount of formed $NO_x$ which at this same lancing velocity would have been formed in case the lance would have been arranged inside the burner 2a, 2b, 2c, 2d itself, in other words the lance 3a, 3b, 3c, 3d would debouch within the surface which is parallel in relation to the inside of the furnace 1 wall, and which is taken up by the burner 2a, 2b, 2c, 2d.

Depending on the actual application, a typical, suitable distance 4 between air burner 2a, 2b, 2c, 2d and lance 3a, 3b, 3c, 3d has been found to be at least 0.3 meters, preferably between 0.5 meters and 1.2 meters, preferably between 0.7 meters and 0.9 meters. In other applications, the distance may be between 1.5 and 4 characteristic diameters, more preferably between 2.5 and 4 characteristic diameters, however at least 0.3 meters. The characteristic diameter is the diameter of the circle that encloses all supply openings for the primary oxidant. Usually, the primary oxidant is supplied through a hole, through a ring-formed slit or through several holes arranged along with one or several circles, meaning that the centres of the holes are located along one or several concentrically arranged circles.

A suitable distance 5 c/c between two adjacent burners, in other words the distance between the respective centre of two adjacent burners in the above mentioned plane that is parallel to the furnace 1 wall, has been found to be at least about 2 characteristic diameters or at least 2 meters.

In addition to the advantage that the amount of formed $NO_x$ is drastically decreased, at the above described high lancing velocities the advantage arises of there being no need for several lances per burner 2a, 2b, 2c, 2d in order to reach sufficient flame symmetries. The reason for this is the heavy turbulence arising during operation according to the present invention.

It is preferred that each respective lance 3a, 3b, 3c, 3d is arranged at such an angle in relation to the respective burner 2a, 2b, 2c, 2d that the stream of the additional oxidant does not cross the flame from the respective burner 2a, 2b, 2c, 2d. According to one embodiment, the lanced stream of additional oxidant is directed in parallel to the flame. According to another embodiment, the additional oxidant is directed somewhat away from the flame. This results in a more even mixing of furnace gases before the additional oxidant reacts with the fuel, which further increases the temperature homogeneity in the furnace 1 space.

In FIG. 1, a control device 6 is also shown in a principal manner, which control device 6 controls the supply of fuel, via a fuel conduit 8, and air, via an air conduit 9, to an air burner 2d. Moreover, the control device 6 controls, via a conduit 7 for additional oxidant 7, the supply of such additional oxidant to a lance 3d associated with the burner 2d. Thus, the control device 6 is arranged to control the supply of both fuel, air and additional oxidant to the burner 2d. According to a preferred embodiment, there is a separately acting control device arranged to control the operation of each burner 2a, 2b, 2c, 2d that is furnished with a lance, so that the operation of each such burner 2a, 2b, 2c, 2d may be controlled individually. However, in FIG. 1 only one such control device 6 is shown, for reasons of clarity. It is realised that the individual control devices also may be arranged in the form of a single or a smaller number of control devices, which in a per se conventional manner controls the various burners and their respective associated lances individually.

When applying the present invention in the furnace 1, according to a preferred embodiment the additional oxidant is supplied only when the burner 2a, 2b, 2c, 2d is operated with at the least a certain lowest power, that is with a power which is between the certain lowest power and full power of the burner 2a, 2b, 2c, 2d.

Figure 2:
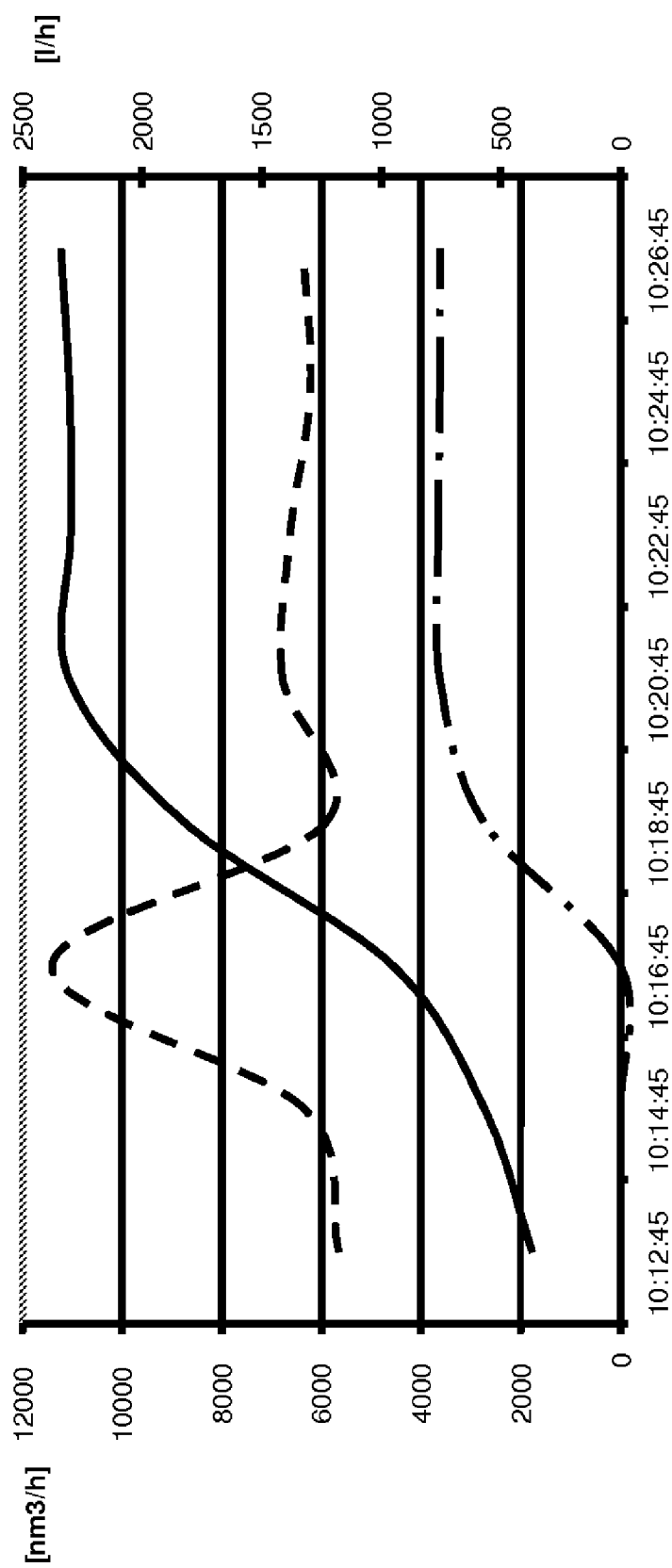
FIG. 2 is a diagram showing flows of air, additional oxidant and fuel for a burner operated in accordance with the present invention.

This can be clearly seen in FIG. 2, which as a function of time shows the operation of an air burner using oil as fuel, using a method with additionally lanced oxidant according to the present invention during the very switching on of the burner in question. Thus, in the diagram is shown the flow of oil (unbroken line, l/h, right-hand Y-axis), air (broken line, $Nm^3/h$, left-hand Y-axis) and additionally supplied oxidant (dashed and dotted line, $Nm^3/h$, left-hand Y-axis) for the burner as a function of time past from the start of operation (X-axis). During adjustment of the burner towards higher powers from a stand-by state, functions representing flow of oil, air and additional oxidant are obtained similar to those shown in FIG. 2.

At low powers, the oil flow in the burner is increased continuously as the power of the burner increases. In the beginning, the burner is operated only with air as oxidant. As the power of the burner increases above a certain point, at which the idle air flow of the burner does no longer suffice to supply the burner (in FIG. 2, this happens at about 10:14:45), the air flow begins to increase remarkably. In order to thereafter further increase the power of the burner, supply of additional oxidant begins (about 10:16:45), via the lance arranged at a distance from the burner. The supply of additional oxidant begins, as mentioned above, when the burner is operated with a certain lowest power.

According to a preferred embodiment, this lowest power is 20% or higher of the maximum power of the air burner. According to an additionally preferred embodiment, the lowest power is 25% or higher of the maximum power of the burner.

Thereafter, the flow of the additionally supplied oxidant increases, depending on the increasing flow of fuel, up to the desired operating power. The flow of air, on the other hand, is again adjusted back to the idle flow. During this whole process, the relation between on the one hand the total amount of oxygen in the air and in the supplied additional oxidant and on the other hand the amount of fuel, is controlled to be a predetermined value. This predetermined value may be a constant or a function of the proportion of additional oxidant in relation to the amount of air.

According to a preferred embodiment, the stoichiometrical relationship between the supplied fuel and the totally supplied oxidant is such that a close to stoichiometrical mixture is achieved. The expression "close to stoichiometrical mixture" aims at Lambda values between about 0.95 and 1.2. It is preferred that this close to stoichiometrical mixture is achieved either for an individual burner, for a certain combustion zone or for the furnace as a whole.

According to another preferred embodiment, a higher relationship (preferably Lambda cirka 1.15) is used when using only air, that is at lower combustion powers, and a lower relationship (preferably Lambda cirka 1.05) when using a larger proportion additional oxidant, that is at higher combustion powers. In general it is preferred that the surplus of total oxidant in relation to the fuel is controlled so that Lambda is lower when the proportion of additional oxidant is higher.

Herein, the expression "Lambda" is used with the meaning that, for example, when Lambda=1.15, this means that an oxygen surplus of 15% of the stoichiometrically necessary amount of oxygen to fully oxidise the fuel is present.

When the oxidant is supplied in such proportions, an additional rise in the efficiency of the process is achieved by the oxidant thus supplied ameliorating the combustion in the heated furnace and contributing to further lowering of $NO_x$ emissions as the amount of nitrogen supplied to the combustion in the combustion air decreases. Moreover, the further decreased demand for air resulting from this control principle makes it possible to achieve even more enhanced heat recovery in the case where the combustion air is preheated, which is preferred.

Thus, the relationship regarding supplied oxygen between the air supply of the burner and the lanced oxidant will vary heavily across different operating powers of the burner. Especially, all supplied oxygen will originate in the air supply of the burner at powers below the certain lowest power, and at least 40% of the supplied oxygen will originate from the additional oxidant during operation at full or near full power.

In addition to the above described advantages, a method exploiting a variable amount of lanced additional oxidant in according to the above said, thus makes it possible to operate an existing air burner efficiently over a very broad power interval in case a lance according to the present invention is installed in connection to the burner.

According to a preferred aspect of the present invention, during new installations, one or several air burners are mounted in combination with one or several lances of the type described above. Hereby, according to this aspect, air burners having only so large capacity to correspond to somewhat more than the normal idle consumption of air, according to the above said, are mounted. Then, remaining oxidant is supplied through such lancing of additional oxidant as has been described above. This results in substantial cost savings regarding ventilating, preheating, control and air injection equipment.

Above, preferred embodiments have been described. However, it is apparent to the skilled person that many modifications may be made to the described embodiments without departing from the idea of the invention. Thus, the invention shall not be limited to the described embodiments, but rather be variable within the scope of the enclosed claims.

For example, the above described relation between totally supplied oxidant and fuel needs not be effective for all individually arranged pairs of lances for additional oxidant and air burners. Instead, the relationship may be reached by the total supply of air and additionally lanced oxidant of a group of one or more lances in combination with one or more air burners being balanced against the totally supplied amount of fuel in the group.

The invention claimed is:

1. Method for homogenizing the heat distribution as well as decreasing the amount of $NO_x$ in the combustion products when operating an industrial furnace (1) with at least one conventional burner (2a, 2b, 2c, 2d) using air as oxidant, where a lance (3a, 3b, 3c, 3d) is introduced into the furnace (1), the method comprising streaming an additional oxidant comprising at least 50% oxygen gas into the furnace (1) through the lance (3a, 3b, 3c, 3d), and the total amount of oxygen supplied, partly through the air, partly through the additional oxidant, is supplied in a predetermined ratio in relation to the amount of fuel being supplied through the air burner (2a, 2b, 2c, 2d), wherein
at least 40% of the supplied oxygen is supplied through the additional oxidant,
the lance (3a, 3b, 3c, 3d) is caused to be arranged at a distance from the air burner (2a, 2b, 2c, 2d) of at least 0.3 meters,
the additional oxidant is caused to stream into the furnace (1) through the lance (3a, 3b, 3c, 3d) with at least sonic velocity, and the additional oxidant is supplied only when the air burner (2a, 2b, 2c, 2d) is operated at or above a certain lowest power.

2. Method according to claim 1, wherein the predetermined ratio between the total supplied oxidant and supplied fuel is caused to be such that a stoichiometric surplus of oxidant is present during the combustion, and the surplus of oxidant in relation to fuel is controlled so that Lambda is lower when the proportion of additionally supplied oxidant is higher.

3. Method according to claim 2, the distance (4) between the burner (2a, 2b, 2c, 2d) and the lance (3a, 3b, 3c, 3d) is caused to be between 1.5 and 4 times the diameter of a circle that encloses all supply openings for air and at least 0.3 meters.

4. Method according to claim 1, wherein only one lance (3a, 3b, 3c, 3d) is used for each burner (2a, 2b, 2c, 2d) in the industrial furnace (1).

5. Method according to claim 4, wherein the distance (4) between the burner (2a, 2b, 2c, 2d) and the lance (3a, 3b, 3c, 3d) is caused to be between 1.5 and 4 times the diameter of a circle that encloses all supply openings for air and at least 0.3 meters.

6. Method according to claim 1, wherein the distance (4) between the burner (2a, 2b, 2c, 2d) and the lance (3a, 3b, 3c, 3d) is caused to be between 0.5 meters and 1.2 meters.

7. Method according to claim 6, wherein the distance (4) between the burner (2a, 2b, 2c, 2d) and the lance (3a, 3b, 3c, 3d) is caused to be between 0.7 and 0.9 meters.

8. Method according to claim 1, wherein the distance (4) between the burner (2a, 2b, 2c, 2d) and the lance (3a, 3b, 3c, 3d) is caused to be between 1.5 and 4 times the diameter of a circle that encloses all supply openings for air and at least 0.3 meters.

9. Method according to claim 8, wherein the distance (4) between the burner (2a, 2b, 2c, 2d) and the lance (3a, 3b, 3c, 3d) is caused to be between 2.5 and 4 times the diameter of the circle.

10. Method according to claim 8, wherein several burners (2a, 2b, 2c, 2d) are arranged with one respective lance (3a, 3b, 3c, 3d) each, and the center-to-center distance (5) between two adjacent burners in a plane which is parallel to the furnace wall is caused to be at least about 2 times the diameter of the circle.

11. Method according to claim 1, wherein the lance (3a, 3b, 3c, 3d) is arranged in such a direction so that the stream of additional oxidant does not cross the flame of the burner (2a, 2b, 2c, 2d).

12. Method according to claim 1, wherein at least 50% of the supplied oxygen is supplied through the additional oxidant.

13. Method according to claim 12, wherein between 50% and 80% of the supplied oxygen is supplied through the additional oxidant.

14. Method according to claim 1, wherein the additional oxidant being supplied through the lance is an oxidant having at least 85 percent by weight of oxygen.

15. Method according to claim 1, wherein the additional oxidant is supplied through a de laval nozzle in the lance (3a, 3b, 3c, 3d).

16. Method according to claim 1, wherein the additional oxidant is supplied at a velocity of at least 1.5 times the sonic velocity.

17. Method according to claim 16, wherein the additional oxidant is supplied at a velocity of between 1.5 times the sonic velocity and 1.8 times the sonic velocity.

18. Method according to claim 1, wherein several burners (2a, 2b, 2c, 2d) are arranged with one respective lance (3a, 3b, 3c, 3d) each, and the center-to-center distance (5) between two adjacent burners in a plane which is parallel to the furnace wall is caused to be at least about 2 meters.

19. Method according to claim 1, wherein the certain lowest power is 20% or higher of full power.

* * * * *